(12) United States Patent
Dudrenov et al.

(10) Patent No.: US 12,425,563 B2
(45) Date of Patent: Sep. 23, 2025

(54) EMULATING A MIRROR WITH A LENTICULAR DISPLAY

(71) Applicant: Apple Inc., Cupertino, CA (US)

(72) Inventors: Pavel V. Dudrenov, San Francisco, CA (US); Zachary D. Corley, Westminster, CO (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/894,294

(22) Filed: Sep. 24, 2024

(65) Prior Publication Data

US 2025/0113018 A1  Apr. 3, 2025

Related U.S. Application Data

(60) Provisional application No. 63/541,679, filed on Sep. 29, 2023.

(51) Int. Cl.
| | |
|---|---|
| *H04N 13/305* | (2018.01) |
| *H04N 13/111* | (2018.01) |
| *H04N 13/128* | (2018.01) |
| *H04N 13/156* | (2018.01) |
| *H04N 13/218* | (2018.01) |
| *H04N 13/383* | (2018.01) |

(52) U.S. Cl.
CPC ......... *H04N 13/305* (2018.05); *H04N 13/111* (2018.05); *H04N 13/128* (2018.05); *H04N 13/156* (2018.05); *H04N 13/218* (2018.05); *H04N 13/383* (2018.05)

(58) Field of Classification Search
CPC ..... H04N 13/128; H04N 13/20; H04N 13/305
See application file for complete search history.

(56) References Cited

U.S. PATENT DOCUMENTS

| | | | |
|---|---|---|---|
| 6,191,808 B1* | 2/2001 | Katayama | G09G 5/397 348/E13.043 |
| 8,243,123 B1* | 8/2012 | Geshwind | H04N 13/261 348/42 |
| 2009/0002368 A1* | 1/2009 | Vitikainen | H04N 13/128 345/422 |
| 2009/0153652 A1* | 6/2009 | Barenbrug | G06T 15/005 348/54 |
| 2011/0109629 A1* | 5/2011 | Ericson | H04N 13/275 345/426 |
| 2018/0288387 A1* | 10/2018 | Somanath | H04N 13/271 |
| 2019/0206112 A1* | 7/2019 | Vaganov | G06F 3/03545 |
| 2020/0193677 A1* | 6/2020 | Vaganov | A63F 13/65 |

* cited by examiner

*Primary Examiner* — Justin W Rider
(74) *Attorney, Agent, or Firm* — Fernando & Partners, LLP (57) ABSTRACT

In one implementation, a method of operating a lenticular display is performed by a device including a processor, non-transitory memory, and a lenticular display. The method includes capturing, from a first camera location in a physical environment, a first image of a user. The method includes capturing, from a second camera location in the physical environment, a second image of the user. The method includes transforming the first image and the second image by horizontally flipping the first image and the second image. The method includes displaying, on the lenticular display, the transformed first image at a display angle corresponding to a first eye location of the user and the transformed second image at a display angle corresponding to a second eye location of the user.

20 Claims, 4 Drawing Sheets

Capturing, from a first camera location in a physical environment, a first image of a user —310

Capturing, from a second camera location in the physical environment, a second image of the user —320

Transforming the first image and the second by horizontally flipping the first and the second image —330

Displaying, on the lenticular display, the transformed first image at a display angle corresponding to a first eye location of the user and the transformed second image at a display angle corresponding to a second eye location of the user —340

EMULATING A MIRROR WITH A LENTICULAR DISPLAY

CROSS-REFERENCE TO RELATED APPLICATIONS

This application claims priority to U.S. Provisional Patent App. No. 63/541,679, filed on Sep. 29, 2023, which is hereby incorporated by reference in its entirety.

TECHNICAL FIELD

The present disclosure generally relates to lenticular displays and, in particular, to systems, methods, and devices for emulating a mirror with a lenticular display.

BACKGROUND

Lenticular displays are capable of displaying different content at different angles. For example, in some embodiments, when viewing a lenticular display from a first horizontal angle, an object is seen from a first perspective and when viewing the lenticular display from a second horizontal angle, the object is seen from a second perspective, different than the first perspective.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for operating a lenticular display. In various implementations, a method is performed at a device including a processor, non-transitory memory, and a lenticular display. The method includes capturing, from a first camera location in a physical environment, a first image of a user. The method includes capturing, from a second camera location in the physical environment, a second image of the user. The method includes transforming the first image and the second image by horizontally flipping the first image and the second image. The method includes displaying, on the lenticular display, the transformed first image at a display angle corresponding to a first eye location of the user and the transformed second image at a display angle corresponding to a second eye location of the user.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Lenticular displays are capable of displaying different content at different angles. For example, in various implementations, when viewing a lenticular display from a first horizontal angle, an object is seen from a first perspective and when viewing the lenticular display from a second horizontal angle, the object is seen from a second perspective, different than the first perspective.

In various implementations, a lenticular display includes a matrix of pixels over which a lenticular lens pattern is laid. In various implementations, a first set of the matrix of pixels is visible from a first horizontal angle, a second set of the matrix of pixels is visible from a second horizontal angle, a third set of the matrix of pixels is visible from a third horizontal angle, and so on. In various implementations, each set of the matrix of pixels includes a subset of the columns of the matrix. For example, in various implementations, the first set includes columns 1, 1+N, 1+2N, 1+3N, etc., the second set includes columns 2, 2+N, 2+2N, 2+3N, etc., the third set includes columns 3, 3+N, 3+2N, 3+3N, etc., where N is the number of sets and the number of horizontal angles at which the lenticular display can display different content.

In various implementations described below, this feature of lenticular displays is used to present different views at different horizontal angles with respect to the lenticular display. For example, in various implementations, different content is presented to different eyes of a user at different horizontal angles. In particular, at the horizontal angle of the left eye of a user, an object is displayed from the perspective of the left eye and at the horizontal angle of the right eye of a user, the object is displayed from the perspective of the right eye, thereby providing a stereoscopic (or three-dimensional) view of the object. In various implementations, the object is the user, emulating a mirror.

Figure 1A:
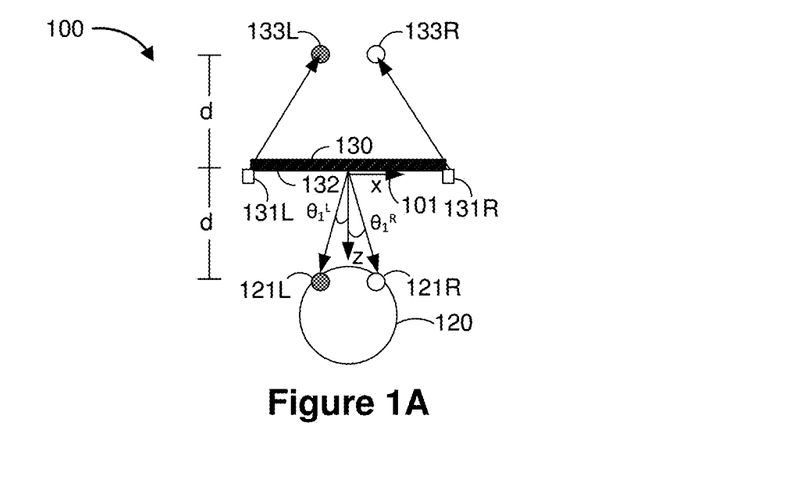
FIGS. 1A-1C illustrate an operating environment including a lenticular display in accordance with some implementations.

FIG. 1A illustrates an overhead view of an operating environment 100 including a lenticular display 132 in accordance with some implementations. The operating environment 100 includes an electronic device 130 and a user 120. The electronic device 130 includes a left image sensor 131L and a right image sensor 131R to capture images of the user 120. The electronic device 130 includes a lenticular display 132 to display the images, with optional augmentation, to the user 120.

The operating environment 100 has a three-dimensional coordinate system. Similarly, the electronic device 130 has a three-dimensional coordinate system (represented by axes 401) related to the three-dimensional coordinate system of the operating environment 100 by a coordinate system transform that changes as the electronic device 130 moves in the operating environment 100. In various implementations, the three-dimensional coordinate system of the electronic device 130 includes a horizontal dimension (left and right on the page in FIG. 1A) represented by an x-coordinate, a vertical dimension (into and out of the page in FIG. 1A) represented by a y-coordinate, and a depth dimension (up and down on the page in FIG. 1A) represented by a z-coordinate. In FIG. 1A, the user 120 is approximately the distance, d, in front of the electronic device 130 in the depth dimension. The user 120 has a left eye 121L at a first left angle, $\theta_1^L$, with respect to lenticular display 132 (e.g., with respect to the yz-plane) and a right eye 121R at a first right angle, $\theta_1^R$, with respect to the lenticular display 132.

Figure 1B:
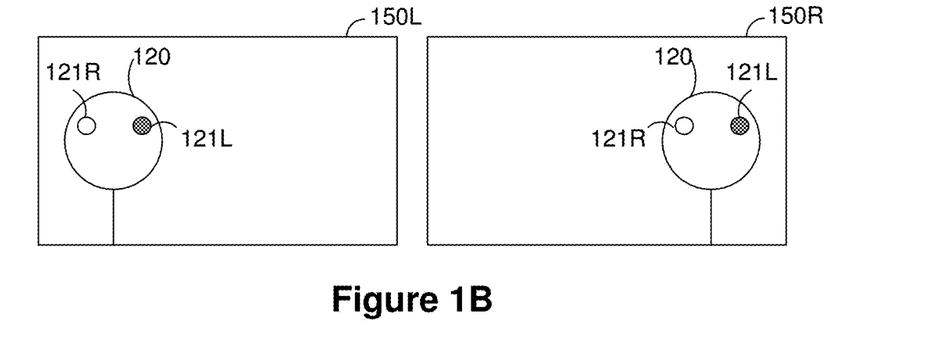

FIG. 1B illustrates a first left captured image 150L of the user 120 captured by the left image sensor 131L of the electronic device 130 and a first right captured image of the user 120 captured by the right image sensor 131R of the electronic device 130. The first left captured image 150L includes an image representation of the user 120. Thus, in the first left captured image 150L, the image representation of the user 120 appears approximately at the distance, d, from the left image sensor 131L in the depth dimension. Further, the image representation of the user 120 is not flipped horizontally. Thus, whereas the left eye 121L of the user 120 is shaded gray, the image representation of the user 120 also appears to have a left eye 121L shaded gray. Similarly, the first right captured image 150R includes an image representation of the user 120. Thus, in the first right captured image 150R, the image representation of the user 120 appears approximately the distance, d, from the right image sensor 131R in the depth dimension. Further, the image representation of the user 120 is not flipped horizontally. Thus, whereas the left eye 121L of the user 120 is shaded gray, the image representation of the user 120 also appears to have a left eye 121L shaded gray.

Figure 1C:
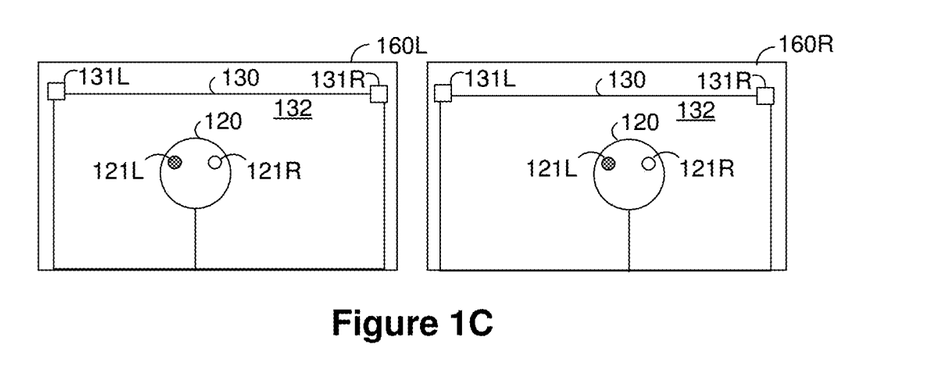

FIG. 1C illustrates a first left view 160L of the operating environment 100 from the perspective of the left eye 121L of the user 120 and a first right view 160R of the operating environment 100 from the perspective of the right eye 121R of the user 120. The first left view 160L and the first right view 160R each includes a view of the electronic device 130.

The lenticular display 132 displays a first left image at the first left angle and a first right image, different than the first left image, at the first right angle. Thus, the first left view 160L from the perspective of the left eye 121L of the user 120 includes the first left image displayed by the lenticular display 132 at the first left angle and the first right view 160R from the perspective of the right eye 121R of the user 120 includes the first right image displayed by the lenticular display 132 at the first right angle. Notably, in the first left image, the right eye 121R of the image representation of the user 120 is at the center of the first left image and, in the first right image, the left eye 121L of the image representation of the user 120 is at the center of the first right image.

The first left image is generated by transforming the first left captured image 150L by reprojecting the first left captured image 150L to a virtual left camera location 133L and flipping the first left captured image 150L horizontally. The virtual left camera location 133L corresponds to the location of the left eye 121L of the user 120 reflected across the plane spanned by the lenticular display 132 (e.g., by multiplying the z-coordinate of the location of the left eye 121L of the user 120 by −1). Similarly, the first right image is generated by transforming the first right captured image 150R by reprojecting the first right captured image 150R to a virtual right camera location 133R and flipping the first right captured image 150R horizontally. The virtual right camera location 133R corresponds to the location of the right eye 121R of the user 120 reflected across the plane spanned by the lenticular display 132 (e.g., by multiplying the z-coordinate of the location of the right eye 121R of the user 120 by −1).

By stereoscopically viewing the first left image and the first right image, the user 120 perceives a three-dimensional mirrored view of the user 120 without wearing a head-mounted device and without the electronic device 130 including a reflective surface.

Figure 2A:
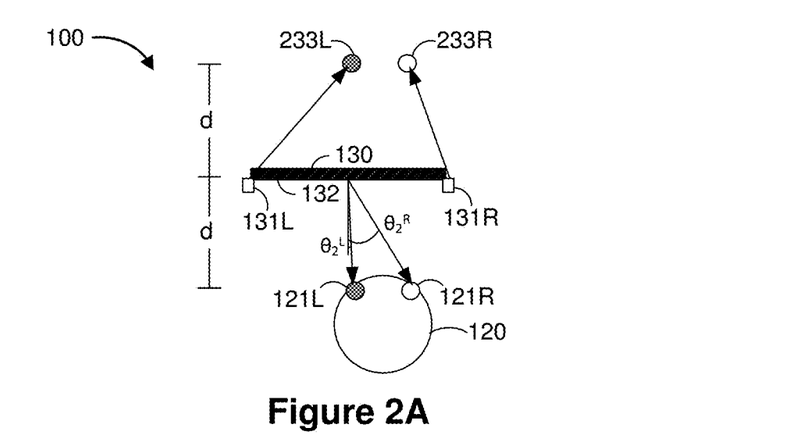
FIGS. 2A-2C illustrate the operating environment of FIGS. 1A-1C after a user has moved in accordance with some implementations.

FIG. 2A illustrates an overhead view of the operating environment 100 after the user 120 has moved to the right (e.g., in the horizontal dimension). Thus, in FIG. 2A, the user 120 is approximately the distance, d, in front of the lenticular digital mirror 130 in the depth dimension. The left eye 121L of the user 120 is at a second left angle, $\theta_2^L$, with respect to lenticular display 132 (e.g., with respect to the yz-plane) and the right eye 121R of the user 120 is at a second right angle, $\theta_2^R$, with respect to the lenticular display 132.

Figure 2B:
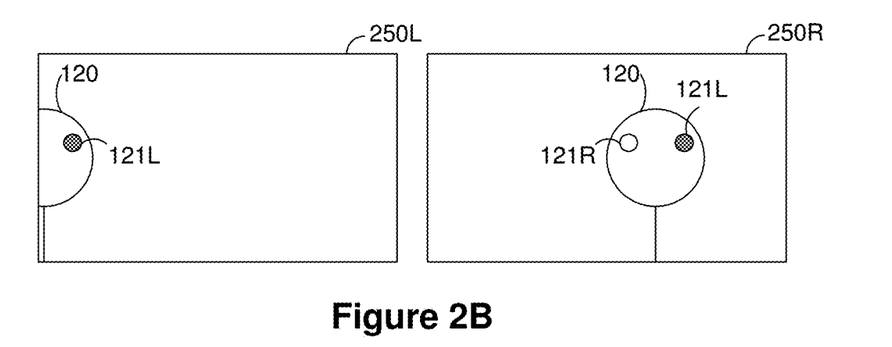

FIG. 2B illustrates a second left captured image 250L of the user 120 captured by the left image sensor 131L of the electronic device 130 and a second right captured image 250R of the user 120 captured by the right image sensor 131R of the electronic device 130. The second left captured image 250L includes an image representation of the user 120. Thus, in the second left captured image 250L, the image representation of the user 120 appears approximately at the distance, d, from the left image sensor 131L in the depth dimension. Further, the image representation of the user 120 is not flipped horizontally. Thus, whereas the left eye 121L of the user 120 is shaded gray, the image representation of the user 120 also appears to have a left eye 121L shaded gray. In comparison to the first left captured image 150L, because the user 120 has moved to the right, the image representation of the user 120 has moved to the left in the second left captured image 250L.

Similarly, the second right captured image 250R includes an image representation of the user 120. Thus, in the second right captured image 250R, the image representation of the user 120 appears approximately the distance, d, from the right image sensor 131R in the depth dimension. Further, the image representation of the user 120 is not flipped horizontally. Thus, whereas the left eye 121L of the user 120 is shaded gray, the image representation of the user 120 also appears to have a left eye 121L shaded gray. In comparison to the first right captured image 150R, because the user 120 has moved to the right, the image representation of the user 120 has moved to the left in the second right captured image 250R.

Figure 2C:
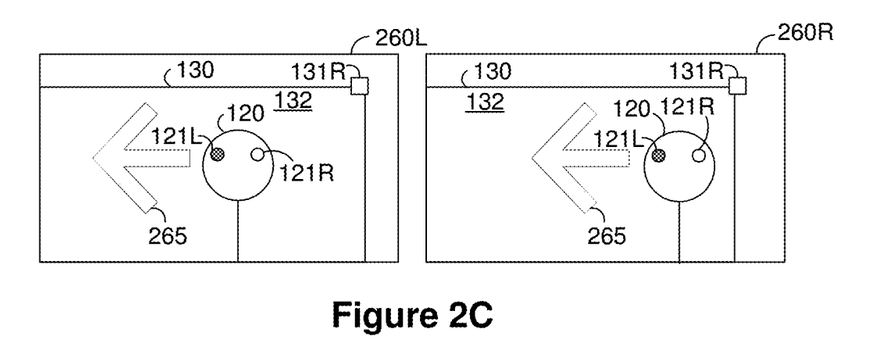

FIG. 2C illustrates a second left view 260L of the operating environment 100 from the perspective of the left eye 121L of the user 120 and a second right view 260R of the operating environment 100 from the perspective of the right eye 121R of the user. The second left view 260L and the second right view 260R each includes a view of the electronic device 130.

The lenticular display 132 displays a second left image at the second left angle and a second right image, different than the second left image, at the second right angle. Thus, the second left view 260L includes the second left image displayed by the lenticular display 132 at the second left angle and the second right view 260R includes the second right image displayed by the lenticular display 132 at the second right angle.

The second left image is generated by transforming the second left captured image 250L by reprojecting the second left captured image 250L to an updated virtual left camera location 233L and flipping the second left captured image 250L horizontally. The updated virtual left camera location 233L corresponds to the updated location of the left eye 121L of the user 120 reflected across the plane spanned by the lenticular display 132 (e.g., by multiplying the z-coordinate of the location of the left eye 121L of the user 120 by −1). Similarly, the second right image is generated by transforming the second right captured image 250R by reprojecting the second right captured image 250R to an updated virtual right camera location 233R and flipping the first right captured image 250R horizontally. The updated virtual right camera location 233R corresponds to the location of the right eye 121R of the user 120 reflected across the plane spanned by the lenticular display 132 (e.g., by multiplying the z-coordinate of the location of the right eye 121R of the user 120 by −1).

The second left image and the second right image are also generated by rendering virtual content (e.g., a virtual arrow 565) from the updated virtual left camera location 233L and the updated virtual right camera location 233R and compositing the corresponding virtual content with the corresponding transformed image. In various implementations, the virtual content provides feedback to a user during a calibration procedure of the electronic device 130. In various implementations, the virtual content provides an XR experience, such as allowing the user 120 to view themselves wearing virtual sunglasses without wearing a head-mounted device and with the electronic device including a reflective surface.

Figure 3:
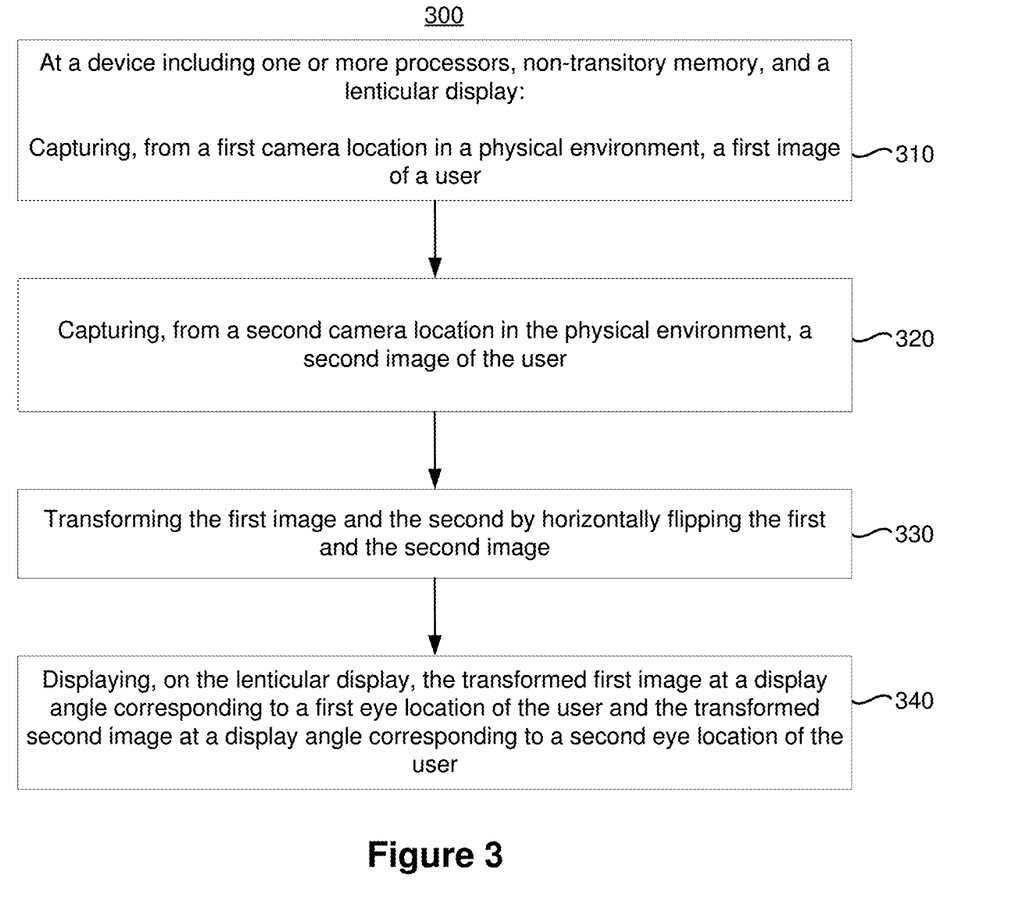
FIG. 3 is a flowchart representation of a method of operating a lenticular display in accordance with some implementations.

FIG. 3 is a flowchart representation of a method 300 of operating a lenticular display in accordance with some implementations. In various implementations, the method 300 is performed by a device including one or more processors, non-transitory memory, and a lenticular display (e.g., the electronic device 130 of FIG. 1A). In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device capturing, from a first camera location in a physical environment, a first image of a user. For example, FIG. 1B illustrates, captured by the left image sensor 131L of the electronic device 130, the first left captured image 150L including the user 120. In various implementations, the first image of the user includes a first eye of the user. In various implementations, the first image of the user can further include additional portions of the user, such as the second eye of the user, the face of the user, the head of the user, the torso of the user, or the entire body of the user.

The method 300 continues, in block 320, with the device capturing, from a second camera location in the physical environment, a second image of the user. For example, FIG. 1B illustrates, captured by the right image sensor 131R of the electronic device 130, the first right captured image 150R including the user 120. In various implementations, the second image of the user includes a second eye of the user. In various implementations, the second image can further include additional portions of the user, such as the first eye of the user, the face of the user, the head of the user, the torso of the user, or the entire body of the user.

In various implementations, the first camera location and the second camera location are the same location. Accordingly, in various implementations, the first image and the second image are captured from the same location. In various implementations, the first image and the second image are captured by the same image sensor. In various implementations, the first image and the second image are the same image.

In contrast, in various implementations, the first camera location and the second camera location are different locations. Accordingly, in various implementations, the first image and the second image are captured by different image sensors. In various implementations, the first image and the second image are different images. For example, in FIG. 1B, the first left captured image 150L and the first right captured image 150R are captured by the left image sensor 131L and the right image sensor 131R and are different images (e.g., in the first left captured image 150L, the representation of the user 120 is in the left half of the image and in the first right captured image 150R, the representation of the user 120 is in the right half of the image).

The method 300 continues, in block 330, with the device transforming the first image and the second image by horizontally flipping the first image and the second image. For example, in various implementations, the image is an N×M matrix of pixels, each having a respective pixel value $u_{ij}$ for i between 1 and N and j between 1 and M. The flipped image is also an N×M matrix of pixels having pixel values $v_{ij}$ for i between 1 and N and j between 1 and M, wherein $v_{ij} = u_{(N+1-i)j}$.

The method 300 continues, in block 340, with the device displaying, on the lenticular display, the transformed first image at a display angle corresponding to a first eye location of the user and the transformed second image at a display angle corresponding to a second eye location of the user.

In various implementations, the first eye location and the second eye location are different locations and the first eye is different than the second eye. For example, in various implementations, the first eye is the left eye of the user and the second eye is the right eye of the user (or vice versa). Further, it is to be appreciated that the first eye location is different than the first camera location and the second camera location and that the second eye location is different than the first camera location and the second camera location.

In various implementations, the first camera location, the first eye location, the second camera location, and the second eye location are each associated with a respective set of three-dimensional coordinates of a three-dimensional coordinate system of the physical environment. In various implementations, the first camera location, the first eye location, the second camera location, and the second eye location are each associated with a respective set of three-dimensional coordinates of a three-dimensional coordinate system of the device. The three-dimensional coordinate system of the device and the three-dimensional coordinate system of the physical environment are related by a coordinate system transform that changes as the device moves in the physical environment.

In various implementations, the three-dimensional coordinate system of the device includes a horizontal dimension (defined by an x-coordinate) parallel to a line between a left image sensor and a right image sensor of the device. In various implementations, the three-dimensional coordinate system of the device includes a horizontal dimension (defined by an x-coordinate) parallel to a row of pixels of the lenticular display. In various implementations, the three-dimensional coordinate system of the device includes a vertical dimension (defined by a y-coordinate) defined by an inertial measurement unit (IMU) of the device. In various implementations, the three-dimensional coordinate system of the device includes a vertical dimension (defined by a y-coordinate) that is parallel to a column of pixels of the lenticular display. In various implementations, the three-dimensional coordinate system includes a depth dimension (defined by a z-coordinate) parallel to an optical axis of at least one image sensor of the device. In various implementations, the three-dimensional coordinate system includes a dimension that is perpendicular to the other two dimensions (however defined).

In various implementations, the method 600 includes determining at least one of the first camera location, the first eye location, the second camera location, or the second eye location. In various implementations, the method 600 includes determining at least one of the first camera location, the first eye location, the second camera location, or the second eye location in a three-dimensional coordinate system of the physical environment (e.g., determining a set of three-dimensional coordinates in the three-dimensional coordinate system of the physical environment). In various implementations, the method 600 includes determining at least one of the first camera location, the first eye location, the second camera location, or the second eye location in a three-dimensional coordinate system of the device (e.g., determining a set of three-dimensional coordinates in the three-dimensional coordinate system of the device).

In various implementations, the first camera location is at a first reflected location corresponding to the first eye location reflected across a plane spanned by the lenticular display (e.g., in various implementations, the xy-plane). Accordingly, the first image (after being horizontally flipped) is approximately what the first eye of the user would see if the lenticular display were, instead, a mirror.

However, in various implementations, the first camera location is not at the first reflected location. Accordingly, in various implementations, transforming the first image (in block 330) further includes transforming the first image based on (and to account for) a difference between the first camera location and the first reflected location. For example, in various implementations, transforming the first image further includes at least one of shifting or rescaling the first image based on a difference the first camera location and a first reflected location corresponding to the first eye location reflected across a plane spanned by the lenticular display. For example, shifting the first image may be based on (and account for) a difference between the first camera location and the first reflected location in the horizontal and/or vertical dimensions of the three-dimensional coordinate system of the device and rescaling the first image may be based on (and account for) a difference between the first camera location and the first reflected location in the depth dimension.

In various implementations, shifting and/or rescaling the first image yields an imperfect approximation of what the first eye of the user would see if the lenticular display were, instead, a mirror. Thus, in various implementations, transforming the first image further includes performing a projective transform of the first image based on a difference between the first camera location and a first reflected location corresponding to the first eye location reflected across a plane spanned by the lenticular display depth information of the physical environment and depth information of the physical environment. In various implementations, the depth information includes a depth map indicating, for each pixel of the first image, a distance between the image sensor that captured the first and the portion physical environment represented by the pixel.

In various implementations, the projective transformation is a forward mapping in which, for each pixel of the first image at a pixel location in an untransformed space, a new pixel location is determined in a transformed space of the transformed first image. In various implementations, the projective transformation is a backwards mapping in which, for each pixel of the transformed first image at a pixel location in a transformed space, a source pixel location is determined in an untransformed space of the first image.

In various implementations, the source pixel location or the destination pixel location is determined based on a set of four-dimensional homogenous coordinates, at least one the set of the being proportional (or inversely proportional) to the depth at the pixel location. Further, in various implementations, the source pixel location or destination pixel location is determined based on a 4×4 view projection matrix of a first perspective of the image sensor which captured the first image and/or a second perspective. In various implementations, the second perspective is from the first reflected location. In various implementations, the second perspective from a location closer to the first reflected location than the first camera location. In various implementations, the second perspective shares one, two, or three coordinates with the first reflected location in the three-dimensional coordinate system of the device. In various implementations, the source pixel location or destination pixel location is determined based on a 4×4 reprojection matrix which is a multiplication of the view projection matrix of a first perspective of the image sensor which captured the first image and a second perspective (or, for at least one view matrix, its inverse).

Further, in various implementations, the 4×4 reprojection matrix is further a multiplication of a 4×4 horizontal reflection matrix, e.g., [−1 0 0 0; 0 1 0 0; 0 0 1 0; 0 0 0 1]. Thus, in various implementations, the projective transform and the horizontal flipping can be performed as a single transformation.

In various implementations, performing the projective transform results in holes in the transformed first image, e.g., pixel locations of the transformed first image for which there is no corresponding pixel location of the first image. Such holes may be filled via interpolation or using additional images, such as another image from a different perspective (e.g., the second image or images of the user captured at a different time). Thus, in various implementations, performing the projective transform is based on the second image.

Likewise, in various implementations, the second camera location is not at a second reflected location corresponding to the second eye location reflected across a plane spanned by the lenticular display (e.g., in various implementations, the xy-plane). Thus, in various implementations, transforming the second image further includes transforming the second image based on a difference between the second camera location and the second reflected location including any of the transformations discussed above with respect to the first image.

In various implementations, transforming the first image further includes compositing first virtual content with the first image. Thus, in various implementations, the method 600 further includes rendering the first virtual content. In various implementations, the device renders the first virtual content from the perspective of the first eye location. In various implementations, transforming the second image further includes compositing second virtual content with the second image. Thus, in various implementations, the method 600 further includes rendering the second virtual content. In various implementations, the device renders the second virtual content from the perspective of the second eye location. In various implementations, the first virtual content and the second virtual content are the same virtual object rendered from different perspectives. For example, in FIG. 2C, the virtual arrow 265 is viewed from a first perspective in the second left view 260L and from a second perspective in the second right view 260R.

In various implementations, the first virtual content and/or second virtual content provides feedback to a user during a calibration procedure of the device. For example, in various implementations, the first virtual content and/or second virtual content provides feedback during a face scan for, e.g., facial recognition, determining an interpupillary distance, etc. In various implementations, the first virtual content and/or second virtual content provides an XR experience, such as allowing a user to view themselves wearing virtual sunglasses without wearing a head-mounted device.

In various implementations, displaying the transformed first image at the display angle corresponding to the first eye location includes displaying the transformed first image at a first set of columns of pixels of the lenticular display and displaying the transformed second image at the display angle corresponding to the second eye location includes displaying the transformed second image at a second set of columns of pixels of the lenticular display.

In various implementations, displaying the transformed first image and the transformed second image includes interleaving columns of the transformed first image with columns of the transformed second image to form a display image and displaying, on the lenticular display, the display image. In various implementations, interleaving columns of the transformed first image and columns of the transformed second image further comprises interleaving blank columns into the display image. In various implementations, displaying the display image includes activating columns of pixels corresponding to the transformed first image and transformed second image and deactivating columns of pixels corresponding to the blank columns. Thus, for blank columns, portions of the lenticular display can be deactivated for power savings.

In various implementations, as the user moves with respect to the device, the device updates the first image, the second image, and the respective angles at which the transformed updated images are displayed by the lenticular display. Thus, in various implementations, the method 600 further includes capturing, from an updated first camera location in the physical environment, an updated first image of the user; capturing, from an updated second camera location in the physical environment, an updated second image of the user; transforming the updated first image and the updated second image by horizontally flipping the updated first image and the updated second image; and displaying, on the lenticular display, the transformed updated first image at a display angle corresponding to an updated first eye location of the user and the transformed updated second image at a display angle corresponding to an updated second eye location of the user.

Figure 4:
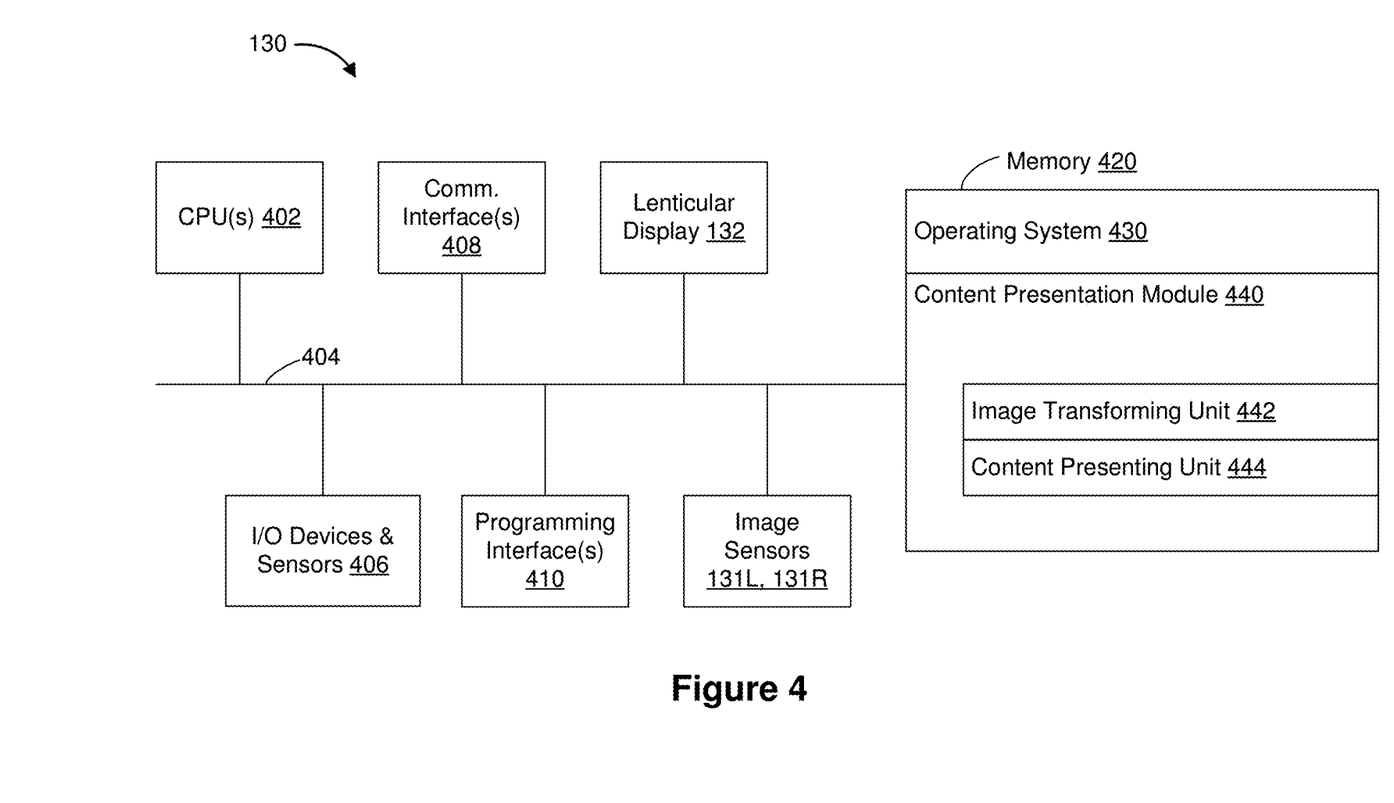
FIG. 4 is a block diagram of an example of the device of FIG. 1A in accordance with some implementations.

FIG. 4 is a block diagram of an example of the electronic device 130 of FIG. 1A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 130 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, a lenticular display 132, image sensors 131L and 131R, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a gyroscope, a thermometer, one or more microphones, one or more speakers, one or more biometric sensors (e.g., blood pressure monitor, heart rate monitor, breathing monitor, electrodermal monitor, blood oxygen sensor, blood glucose sensor, etc.), a haptics engine, one or more depth sensors (e.g., a structured light, a time-of-flight, or the like), and/or the like.

In some implementations, the lenticular display 432 is configured to display different content at different angles. In some implementations, the lenticular display 432 includes holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the lenticular display 432 corresponds to diffractive, reflective, polarized, holographic, etc. waveguide displays. In various implementations, the lenticular display 432 is capable of presenting mixed reality and/or virtual reality content.

In various implementations, the image sensors 431L and 431R include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a content presentation module 440.

The operating system 430 includes procedures for handling various basic system services and for performing hardware dependent tasks. In some implementations, the content presentation module 440 is configured to present different content to different users at different angles via the lenticular display 132. To that end, in various implementations, the content presentation module 440 includes an image transforming unit 442 and a content presenting unit 444.

In some implementations, the image transforming unit 442 is configured to transform (by horizontally flipping) images captured by the image sensor 131L and 131R. To that end, in various implementations, the image transforming unit 442 includes instructions and/or logic therefor, and heuristics and metadata therefor.

In some implementations, the content presenting unit 444 is configured to display the transformed images at different angles of the lenticular display 132. To that end, in various implementations, the content presenting unit 444 includes instructions and/or logic therefor, and heuristics and metadata therefor.

Although the image transforming unit 442 and the content presenting unit 444 are shown as residing on a single device (e.g., the electronic device 130 of FIG. 1A), it should be understood that in other implementations, the image transforming unit 442 and the content presenting unit 444 may be located in separate computing devices.

Moreover, FIG. 4 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including one or more processors, non-transitory memory, an image sensor, and a lenticular display:
    capturing, from a first camera location in a physical environment, a first image of a user;
    capturing, from a second camera location in the physical environment, a second image of the user;
    transforming the first image and the second image by horizontally flipping the first image and the second image; and
    displaying, on the lenticular display, the transformed first image at a display angle corresponding to a first eye location of the user and the transformed second image at a display angle corresponding to a second eye location of the user.

2. The method of claim 1, wherein transforming the first image further includes at least one of shifting or rescaling the first image based on a difference between the first camera location and a first reflected location corresponding to the first eye location reflected across a plane spanned by the lenticular display.

3. The method of claim 1, wherein transforming the first image further includes performing a projective transform of first image based on a difference between the first camera location and a first reflected location corresponding to the first eye location reflected across a plane spanned by the lenticular display and depth information of the physical environment.

4. The method of claim 3, wherein performing the projective transform is based on a reprojection matrix based on multiplication or inverse multiplication of a view projection matrix of a first perspective of the first camera location and a view projection matrix of a second perspective.

5. The method of claim 4, wherein the second perspective is at a location closer to the first reflected location than the first camera location.

6. The method of claim 4, wherein the second perspective is at a location that shares at least one coordinate with the first reflected location.

7. The method of claim 4, wherein the second perspective is at the first reflected location.

8. The method of claim 4, wherein the reprojection matrix is further based on a horizontal reflection matrix.

9. The method of claim 3, wherein performing the projective transform is based on the second image.

10. The method of claim 1, wherein transforming the first image further includes compositing first virtual content with the first image.

11. The method of claim 1, wherein displaying the transformed first image of at the display angle corresponding to the first eye location includes displaying the transformed first image at a first set of columns of pixels of the lenticular display and displaying the transformed second image at the display angle corresponding to the second eye location includes displaying the transformed second image at a second set of columns of pixels of the lenticular display.

12. The method of claim 1, wherein displaying the transformed first image and the transformed second image includes:
  interleaving columns of the first image with columns of the second image to form a display image; and
  displaying, on the lenticular display, the display image.

13. The method of claim 12, wherein interleaving columns of the first image and columns of the second image further comprises interleaving blank columns into the display image.

14. The method of claim 13, wherein displaying the display image includes activating columns of pixels corresponding to the first image and the second image and deactivating columns of pixels corresponding to the blank columns.

15. The method of claim 1, further comprising:
  capturing, from an updated first camera location in the physical environment, an updated first image of the user;
  capturing, from an updated second camera location in the physical environment, an updated second image of the user;
  transforming the updated first image and the updated second image by horizontally flipping the updated first image and the updated second image; and
  displaying, on the lenticular display, the transformed updated first image at a display angle corresponding to an updated first eye location of the user and the transformed updated second image at a display angle corresponding to an updated second eye location of the user.

16. A device comprising:
a lenticular display; and
a non-transitory memory; and
one or more processors to:
  capture, from a first camera location in a physical environment, a first image of a user;
  capture, from a second camera location in the physical environment, a second image of the user;
  transform the first image and the second image by horizontally flipping the first image and the second image; and
  display, on the lenticular display, the transformed first image at a display angle corresponding to a first eye location of the user and the transformed second image at a display angle corresponding to a second eye location of the user.

17. The device of claim 16, wherein the one or more processors are to transform the first image by further performing a projective transform of first image based on a difference between the first camera location and a first reflected location corresponding to the first eye location reflected across a plane spanned by the lenticular display and depth information of the physical environment.

18. The device of claim 16, wherein the one or more processors are to display the transformed first image and the transformed second image by:
  interleaving columns of the first image with columns of the second image to form a display image; and
  displaying, on the lenticular display, the display image.

19. The device of claim 18, wherein the one or more processors are to interleave columns of the first image and columns of the second image by further interleaving blank columns into the display image.

20. A non-transitory memory storing one or more programs, which, when executed by one or more processors of a device with a lenticular display cause the device to:
  capture, from a first camera location in a physical environment, a first image of a user;
  capture, from a second camera location in the physical environment, a second image of the user;
  transform the first image and the second image by horizontally flipping the first image and the second image; and
  display, on the lenticular display, the transformed first image at a display angle corresponding to a first eye location of the user and the transformed second image at a display angle corresponding to a second eye location of the user.

* * * * *